US008245664B2

(12) United States Patent
Mulder et al.

(10) Patent No.: US 8,245,664 B2
(45) Date of Patent: Aug. 21, 2012

(54) ANIMAL MONITORING METHOD AND APPARATUS

(75) Inventors: Ron Mulder, Te Aroha (NZ); Lars Arnerup, Nynashamn (SE)

(73) Assignee: DeLaval Holding AB, Tumba (SE)

( * ) Notice: Subject to any disclaimer, the term of this patent is extended or adjusted under 35 U.S.C. 154(b) by 30 days.

(21) Appl. No.: 13/056,329

(22) PCT Filed: Jul. 27, 2009

(86) PCT No.: PCT/EP2009/005416
§ 371 (c)(1),
(2), (4) Date: Jan. 28, 2011

(87) PCT Pub. No.: WO2010/012431
PCT Pub. Date: Feb. 4, 2010

(65) Prior Publication Data
US 2011/0126770 A1    Jun. 2, 2011

(30) Foreign Application Priority Data

Jul. 28, 2008  (GB) .................................. 0813782.0

(51) Int. Cl.
*A01K 5/00*    (2006.01)
(52) U.S. Cl. ........................................ 119/51.01
(58) Field of Classification Search ............... 119/51.01, 119/51.02, 57.92, 56.1, 51.12, 72, 75, 174
See application file for complete search history.

(56) References Cited

U.S. PATENT DOCUMENTS

| 5,069,165 | A | * | 12/1991 | Rousseau | 119/57.6 |
| 5,355,833 | A |  | 10/1994 | Legrain |  |
| 6,619,228 | B2 | * | 9/2003 | Voogd et al. | 119/51.02 |
| 6,748,898 | B2 | * | 6/2004 | Ulman et al. | 119/57.92 |
| 7,296,537 | B2 | * | 11/2007 | Burghardi et al. | 119/51.02 |
| 7,418,303 | B2 | * | 8/2008 | van de Ligt et al. | 700/90 |

(Continued)

FOREIGN PATENT DOCUMENTS

| EP | 0 391 602 A2 | 10/1990 |
| EP | 1 250 838 A2 | 10/2002 |

OTHER PUBLICATIONS

International Search Report, dated Nov. 13, 2009, from corresponding PCT application.

(Continued)

*Primary Examiner* — Yvonne Abbott
(74) *Attorney, Agent, or Firm* — Young & Thompson

(57) ABSTRACT

A method and installation for automatically determining the readiness of an animal for being weaned off liquid feed and onto dry feed. The height of an animal in an animal installation is automatically measured using a height measurement system at a selected location within the installation. A suitable location within an installation for providing a height gauge may include a feeding station, a cleaning station or other treatment station of an animal. Additional parameters may be used for the determination of readiness to wean in combination with dry feed consumption rate, such as animal age, weight or other animal dimensions. In determining the height, the method may include making a determination of the overall physical condition of the animal and may include a determination of the height-to-weight-ratio of an animal. The installation may include an automatic animal weighing system. Measured values may be stored in a control system memory for monitoring the growth of individual animals. Animal identification means may be provided at the points of measurement of any parameter of an animal.

15 Claims, 3 Drawing Sheets

U.S. PATENT DOCUMENTS

| | | | | |
|---|---|---|---|---|
| 7,827,015 B2 * | 11/2010 | McGoogan et al. | | 703/11 |
| 7,860,659 B2 * | 12/2010 | Goldstein | | 702/19 |
| 7,904,284 B2 * | 3/2011 | Engelke et al. | | 703/11 |
| 8,003,328 B2 * | 8/2011 | Rosenkrans, Jr. | | 435/6.11 |
| 8,019,633 B2 * | 9/2011 | Stroman et al. | | 705/7.11 |
| 2004/0074446 A1 | 4/2004 | Hawn et al. | | |

OTHER PUBLICATIONS

Gercilio Alves de de Almeida, Jr. et al., "Performance of Holstein calves fed until weaning time with high moisture grains silage or dry ground grains of corn or sorghum", Revista Brasileira de Zootecnia, 2008, pp. 140-147, vol. 37, No. 1; English-language Abstract.

* cited by examiner

ANIMAL MONITORING METHOD AND APPARATUS

The present invention relates to animal installations for keeping or rearing young animals and to a method which may be used for monitoring animals.

Young animals such as calves, piglets, lambs, young goats, foals and such like, are generally fed with a liquid diet during the first weeks of their lives. The diet may consist of milk, milk substitute, e.g. milk made up from powdered milk, a liquid feed made up from a nutrition powder, and other similar substances. All such liquid diet substances are herein referred to as liquid feed. In many instances, in contemporary installations for rearing animals, the liquid feed is given to individual animals in predetermined quantities at predetermined times or with a predetermined frequency on a daily basis. Alternatively, liquid feed may be made available to animals on demand. After weaning, animals are no longer supplied with liquid feed, but receive dry feed which may be a concentrate and may be supplemented with roughage.

Different types of installations for rearing young animals are known. It is known for animals to be kept in individual pens, where they receive their feed in an individually provided feed dispenser, which dispenser may be of the bottle and nozzle type which and may be replaced with a full bottle a given number of times per day. Also known are automatic feed dispensers which may dispense feed to individual animals in pens and which may be connected to a common feed supply or which may comprise feed hoppers and a mixing means at each feeding station. Such installations may be used for supplying liquid feed or dry feed to animals. Also water is usually supplied in addition to liquid feed or dry feed.

It is known to provide a calf feeder for supplying a mixture of feed components to young animals in liquid form at a number of feed stations. A system of this type is known for example from U.S. Pat. No. 5,355,833, in which each feeding station comprises means for mixing and supplying different feed ingredients. In addition, each feeding station is provided with a weighing platform. The presence of the weighing platform allows a determination to be made of the progress of an animal's growth and of an animal's size at any given visit to a feed station. According to U.S. Pat. No. 5,355,833, it is proposed to monitor an animal's weight for the purpose of adapting the animal's feed to its rhythm of growth.

The feeding of young animals exclusively with liquid feed is typically carried out during the first weeks of their life. There follows a period of weaning, after which the young animals are fed using dry feed. Dry feed may typically be provided in the form of a mixture of nutrients and ingredients in a so-called feed concentrate. It may also be supplemented with roughage, supplied separately or in addition to the concentrate. The timing of the weaning stage is of importance to both an individual animal and also to the keeper of the animal. On the one hand, weaning can be stressful for an animal, especially if it is carried out prematurely, before a given animal has developed sufficiently to metabolise dry feed and to obtain sufficient nutrients and energy from it, in place of the liquid feed which is easily assimilated and to which the animal is accustomed. The timing of weaning is important economically, because it is desirable that animals should make fast progress through their early development, in order for them to become productive. However, an attempt to wean an animal prematurely is likely to disrupt, and thereby delay the animal's development, while a late weaning of an animal is likely to utilise unnecessary liquid feed resources and time without a corresponding gain for the animal or for the keeper. Late weaning can be understood to signify a weaning which takes place at a point in time after a given animal would have been capable of being weaned. A further consideration concerning weaning is that liquid feed tends to be more expensive to prepare and provide than dry feed.

It has also been a practice in the art to wean an animal at a given age of the animal, which may lie in the range around forty to sixty days, depending on the breed of the animal concerned and depending on individual practices and methods of raising animals. Such a determination of the time for weaning takes no account of the actual physical state of an animal in relation to its preparedness, or not, for weaning. A decision to wean, based on age alone may therefore lead to inefficiency where an animal could have been weaned sooner, or inefficiency due to a poor performance of an animal which is weaned too early. The weaning stage can involve considerable stress for an animal, whose body must become accustomed to a different feed regime, while the animal itself typically has to become accustomed to new surroundings, because weaned animals are usually kept in a different location from younger pre-weaning animals.

The practice of weaning an animal onto dry feed may include providing the young animal with access to some dry feed in addition to its liquid feed, in order that the animal becomes accustomed to the dry feed and in order that the animal develops the bodily capability do digest and assimilate it. In this way, when the animal reaches its weaning age, it will be capable of continuing its growth on dry feed alone.

It would be of great benefit to provide an animal installation and a method which would allow a better determination of the appropriate time for weaning of young animals. It has been found, somewhat unexpectedly, that the height of an animal can provide an excellent indication of the readiness of an animal for weaning.

Accordingly, the present invention provides a method for automatically determining an animal's readiness for weaning as defined in appended claim 1. Further optional features thereof are defined in subclaims 2-5. An apparatus according to the invention, for automatically determining an animal's readiness for weaning is defined in appended claim 6. Further optional aspects of the apparatus are defined in appended claims 7-13.

In further aspects of the present invention, the feeding system may be capable of indicating a readiness for weaning an animal on the basis of more than one parameter selected from the group consisting of: quantity of dry feed intake in a given time period or over more than one time period; height of the animal; weight of the animal; age of the animal in days; amount of water consumed in a given time period, such as for example water consumption per day; change in height of an animal in a given time period. In some cases, parameters relating to heart girth size (the measurement of the circumference of an animal immediately behind the withers) or hip width (width of an animal at the hip joints) or water consumption rate may also used together with one or more of the previously mentioned parameters. In each case, a determination may be made as to whether a threshold value for each parameter being used has been exceeded. In certain aspects, a control system of the animal feeder may indicate that a particular animal is ready to be weaned when two out of three selected parameters are determined to have exceeded or met a corresponding threshold value. For example, a control system may be capable of continuously monitoring dry feed consumption and animal height and animal weight (for example, using weighing means disposed at or near a feed station). When any two of these three parameters are deemed to exceed or equal a predetermined threshold value, then an indication as to readiness for weaning of the animal can be given by the control system. As mentioned above, a threshold value may be an absolute threshold value applicable to all animals in a herd, or it may be an individual threshold value which is determined for each individual animal and which is stored for comparison with measured values of the same animal. In some cases, a threshold value may be a value for a change in height inside a given time period. For example, it may be determined, for each animal, when their height has grown by a predetermined amount from an initial measurement which may have been made at birth or after a predetermined time from birth such as one or two or three days or a few days or a week or a few weeks from birth.

The method of automatically measuring the height of an animal may include identifying an animal at a selected location in an installation and making a determination of the height of the animal. As with any measured parameter value for an animal, the measured value may suitably be stored in a data file or register containing information relating to the particular animal.

In another aspect of the invention, the method of the invention may furthermore include determining a height-to-weight ratio of an individual animal. This determination may be made on the basis of a measured value for the weight of an animal, which may be obtained in an installation at a same location as the location where a height determination is made or it may be another location. In some aspects, the weight of an animal may be determined externally of the installation and may be input into a control system of the installation into a data file of an animal in question. The weight value may be recalled from its stored location and used in combination with a height measurement to determine a height-to-weight ratio of the animal. This ratio may be used to monitor the condition of an animal. A condition of an animal may be determined by a height-to-weight ratio per se or it may be determined by making a comparison between a measured ratio and a predetermined threshold value of the parameter. A predetermined threshold value might be a maximum or a minimum value. A comparison may determine whether a maximum threshold value is exceeded upwards or whether a minimum threshold value is exceeded downwards. In some cases, a threshold value may be an individual threshold value for the animal in question and it may be determined of the basis of the age or parentage or size at birth or other relevant parameter.

In one aspect of a method of the present invention, the method may comprise monitoring and determining the quantity of dry feed consumed by an individual animal in a given time period and may further comprise determining the height of said animal during feeding: the readiness of weaning being determined on the basis of a comparison of measured height and measured dry feed consumption with predetermined threshold values.

In a further aspect, one or more additional measured parameter values are determined and compared with respective minimum threshold values, which additional parameters may be selected from the group consisting of: animal age, animal weight, animal girth size and animal hip width or rate of water consumption.

The level of the predetermined threshold value corresponding to each parameter may vary depending on the number of parameter threshold values which require to be exceeded or equalled before a readiness to wean signal is issued. Thus, where only two parameter threshold values are required to be met or breached, their respective levels may be higher than when, say, those same two and also a third parameter threshold is required to be met. In some cases, the control system may be capable of determining that when three threshold values are exceeded at a given lower level of each of the three values, then an indication as to readiness to wean may be given, while when only two of those parameter threshold values are exceeded at a higher level, then also an indication as to readiness to wean may be given.

In a further development of aspects of the invention, there may be collected both height measurements and also weight measurements from individual animals, each obtained periodically which may be at regular intervals and which may be frequently obtained readings. Given that the height measurement according to the present invention is automated, the task of gathering frequent and reliable height measurements is thereby not an onerous one. Weight information can also be easily collected in an automated manner using known weighing scale or plate means and using identification means, especially transponder identification means of a known type. There may thereby be determined, in a control system of a feeding installation height-to-weight ratio values of a given animal, and in particular successive values determined at repeated intervals over a period of time. This will allow to monitor the condition and development of an animal with a view to reviewing the suitability of its environment and of its diet. To this end, determined height-to-weight ratio values may be compared with predetermined expected values, and a signal may be generated where an animal's determined height-to-weight ratio deviates from an expected value by more than a given margin. In a still further development, successive values of measured height or determined height-to weight ratio may be compared with expected successive values of the corresponding parameter in what can be known as an expected curve. In this way, it may be determined whether or to what extent an entity such as an animal's measured or determined development corresponds to an expected development curve, which may be a height development curve or a height-to weight-ratio development curve. Deviations from the expected curve may be signalled by any suitable signalling or indicating means.

In certain cases, there may be determined an expected development curve corresponding to a height curve or a height-to-weight ratio curve or other development curve for each individual animal. It has been observed that there may be entirely healthy animals whose development may not conform exactly or closely with a predetermined objective development curve. The imposition of a single objective standard upon a large number of animals may lead to inappropriate outcomes where a healthy animal is developing normally albeit not within a given tolerance of a standard development curve. For example, a height development curve or a height-to-weight ratio curve may be determined at a very early age of an animal by noting such parameters as its dimensions and/or weight and/or height-to-weight ratio at birth, and or at a one or two days old and/or at a week old and possibly additionally taking into account factors such as the breed of the animal and relevant measured parameters of its known parents. By following up with a regular monitoring and measurement of an animal, a determination of the condition of the animal at any given time in the future may be carried out by comparing a measured or determined sequence of values (a measured curve) against an expected sequence of values (an expected curve).

In addition to the foregoing, there may be carried out, on the basis of height or weight information which is obtained or collected, a determination of height change over a prescribed period of time and/or weight change over a period of time and/or height-to-weight ratio change over a period of time. In this way, a more accurate and individually adapted parameter may be obtained and used as a basis for determining an animal's condition, or in particular an animal's condition at any given time during its development.

Therefore, in aspects of the present invention which may be the subject of additional claims or separate claims, there may be provided a control system for monitoring animals, which control system determines a condition of an animal on the basis of a comparison between a determined height-to-weight ratio of an animal and an expected height to weight ratio of the animal, which may be an expected height to weight ratio for an individual animal. The result of the comparison may be indicated in any suitable manner and by any suitable means. For example, there may be a warning signal in the form of a light signal or sound signal emitted by the control system when a permitted deviation from an expected value is determined, or there may be a display of the outcome of the comparison by any suitable display means. The result of the comparison may be stored in a memory. In certain aspects, the parameter underlying the aforementioned comparison may be a change in height or a change in height-to-weight ratio over a prescribed time period or interval, which parameter may be called a trend change in height or in height to weight ratio. In certain cases, there may be carried out an adaptation of an animal's feed composition or its feed ration in response to a determination resulting from a comparison with a measured or determined value with an expected value of the corresponding parameter. In a further development of this aspect of the present invention, there may be provided a method for determining the condition of an animal, which method comprises monitoring a relevant parameter of an animal and determining a condition of an animal on the basis of a comparison between a determined height-to-weight ratio of an animal and an expected height to weight ratio of the animal.

Animal installations in different forms include varying amounts of technical aids to the management of the animals kept therein. Increasingly, installations of various descriptions have become larger, increasing the workload involved in all tasks related to animal management. The regular monitoring of certain parameters of animals which are kept does not always provide enough information concerning the condition of the animal, while gathering additional data can be time-consuming, onerous, capital intensive and unreliable.

Regular monitoring of animals, especially of young animals can provide important information as to their progress, allowing data concerning individual animals to be compared with expected or with average values for a herd or for a breed. Regular monitoring can thereby serve to identify animals whose regime is not optimal for their needs. Monitoring animals on an ongoing basis might for example involve carrying out health checks by means of tests or by taking samples from the animal and/or it may take other forms such as weighing or measuring the animal. In any case, considerable work and expense may be involved in regularly monitoring animals. In some cases, such as in the taking of measurements, the manner in which measurements are made, and measurement techniques used by different individuals may affect the values obtained, with the result that different personnel members may measure and record different values, thereby introducing error into the monitoring of an animal.

There exist video imaging systems for making and recording a images of an animal with a view to using image analysis by a processing system for determining the physical condition of the animal. These systems are highly sophisticated and can involve a significant burden on personnel and equipment during use. What is more, the results from imaging systems are seldom better than a result which can be obtained by a subjective score given to an animal by a farmer.

In some establishments, occasional measurement of animals' height is carried out in order to determine whether they have reached a given development stage. This is done manually. Regular determination of the height of an animal tends not to be carried out because it can be a burden for a keeper of animals, who, in order to keep up-to-date records, would be obliged to carry out a regular measurement by hand of each animal, or to lead each animal from its pen to a measurement location, or both. One challenge when measuring an animal's height is the need to measure the animal at a consistently correct location on its body in order to obtain an appropriate and representative height measurement value. Animal height is typically measured at the withers (roughly between the shoulders of the animal) or at the hips. Manual measurement of an animal may lead to measurement error, as an animal moves about and because there is only so much time available for obtaining a measurement of each animal within a group. Nevertheless, animal height can provide a useful indicator of an animal's physical state, so that it would be desirable to devise a means or method for easily monitoring animal height without significant burden.

There is a need for an improved means and method for making a reliable and cost effective determination of the condition of an animal. According to an aspect of the invention, there is provided an animal installation comprising a height measuring system. In a further aspect of the invention, there may be provided an animal installation comprising a control system and a height measurement system in the form of a height gauge, capable of automatically determining the height of an animal. The control system may in particular be capable of recording and storing measurements which are made.

The installation of the invention may comprise a feeding station for one or more animals comprising a height gauge which is capable of making an automatic determination of the height of an animal which is feeding.

According to the invention, a height gauge may include a sensor capable of generating a measurement signal which is representative of a height of an animal. The gauge may include a signal processor capable of determining a measured height of an animal on the basis of the measurement signal. In some cases, a height gauge may be a part of a height measurement system which system includes the said sensor and processor.

In one aspect, in the installation according to the invention, the said height gauge may comprise a laser emitter and receiver located above the level of an animal at a selected location in said installation.

In one aspect, in the installation according to the invention, the said height gauge may comprise at least one infra-red or visible light emitter and at least one corresponding receiver located substantially laterally of an animal space at a selected location in said installation.

In one aspect, in the installation according to the invention, the said height gauge may comprise an ultrasound emitter and receiver located above the level of an animal at a selected location in said installation.

During use, the installation of the invention will comprise a height gauge provided at a selected location in the installation or in relation to the installation. In this way, it is intended that animals which are kept in the installation will find themselves at the selected location where automatic height measurement is carried out, during each animal's normal use of the installation. That is to say, animals may preferably not be required to undergo an additional procedure or step in addition to their existing routine in order to be measured. To this end, the automatic height gauge may be placed at an appropriate selected location in the installation, where animals routinely pass, preferably at least weekly or at least daily or several times daily. Such a location may be in an entrance or exit way or in a race or passageway or it may be in a location where animals are kept or held for a period of time. Accordingly, a selected location for positioning an automatic height gauge may be a feeding station or other pen or enclosure where an animal may pass through or remain momentarily. Further examples of selected locations may include a treatment location such as a cleaning station. In each case, a selected location will include an animal space where an animal may be located at the time when a height measurement is carried out.

Automatic height detection in accordance with the present invention may be carried out at a moment which is automatically determined. In particular, a moment at which a measurement is to be made may be triggered by a control system of the installation or of the height gauge. In some aspects, the relevant control system associated with a height gauge may be a control system of an installation or of a feeding station or of multiple said feeding stations.

In order that measured values are attributable to corresponding animals, there may be provided identification means in an animal installation at a selected location of a height gauge for determining which animal is present in the animal space and being measured therein. In certain cases where a selected location of a height gauge is at a location where a known animal is kept, it may be possible to dispense with identification means. Identification may be carried out in the known way using a transponder arrangement in association with an animal identification database, which may be a register or a set of registers in association with a control system.

A height determination in the present context can in particular refer to a determination of the height of an animal from a reference surface, which may be a surface on which an animal to be measured is standing or lying, to a plane which is coincident with the plane of the back of an animal. This may be a plane at a height of the hips or withers of an animal, or at a height of any other suitable location on the back of an animal. In some cases, the height of multiple points on the back of an animal may be measured, wherein an animal height may be determined to be an average of the measured heights or the height may be stored as multiple height measurements on the back of the animal.

In certain aspects of the invention, a measured height value may be stored as a value reflecting the change in animal height beyond a given height, which may be a starting height for the individual animal. A starting height may be a height of an animal which is measured at or near the beginning of an animal's life, for example at an age of one day or a given number of days such as one week. Thus a determination which is made, by a control system on the basis of a measured height, may optionally be made on the basis of a value for a change in height which may be a measured height minus a predetermined value for a starting height or minus a value for a starting height which is measured and stored for an individual animal.

A feeding station in an installation of the invention may be a stand alone feeding station or it may form part of an installation which comprises one or more feeding stations which installation may thereby comprise a network of feed stations.

According to aspects of the invention, an animal feed station may comprise a control system and at least one feed dispenser, wherein the feed station further comprises a height gauge.

A feed station according to aspects of the invention may suitably be adapted to dispense metered quantities of feed to individual animals, wherein the control system may be capable of monitoring and recording the quantity of feed consumed by an individual animal. Moreover, the control system may be configured to record height measurements from the height gauge. The height gauge may thus be capable of automatically determining the height of an animal which is feeding at the feed station.

A suitable feed station may comprise a liquid feed dispenser or a dry feed dispenser. In some cases, the feed station in the context of the invention may comprise a liquid feed dispenser and a dry feed dispenser. Each feed station may be capable of dispensing feed to animals in metered portions. To this end, each feed station may comprise one or more dispensers, each capable of dispensing a particular type of feed such as liquid feed or dry feed. In some cases, a dispenser may comprise means for supplying discrete portions of feed from one or more feed supply lines to each station or from one or more hoppers provided at the feeding station. There may be provided mixing means at each feeding station for mixing ingredients from more than one hopper or supply line, according to the needs of an individual animal. Information concerning each animal's entitlement to feed and each animal's feed composition may be stored within a memory in the control system. According to the invention, an animal installation may comprise a control system and at least one feed station, wherein the feed station further comprises a height gauge. The feeding station may suitably comprise at least one feed dispenser adapted to dispense metered quantities of feed to individual animals, wherein the control system may be capable of monitoring and recording the quantity of feed consumed by an individual animal. Moreover, the control system may be configured to record height measurements from the height gauge. The height gauge which may be known as a height measurement device, may be capable of automatically determining the height of an animal which is feeding at the feed station. The height gauge may be of any suitable type and in particular of any type herein described.

A feeding station may be a selected location of an animal installation of the invention and may therefore suitably be provided with a height gauge. A feeding station may be provided as a stand alone unit or it may be provided as part of an installation in which many animals are kept and raised. A feeding station may be a location at which animal feeding takes place. In particular, it may be a location where at least one feed dispenser is provided. In certain cases, a feed station may be an enclosure, defined by barriers or walls around an animal space.

The quantity of feed dispensed to each animal may be measured by the dispenser itself for example by means of an auger, the number of turns of which may be counted automatically, or for example by means of a dispenser for dispensing discrete, known quantities of fodder, the number of discrete amounts being automatically counted and stored by the control system. Other suitable means for metering portions of feed are known in the art and may be employed for the purposes of the present invention. As an alternative to measuring a dispensed quantity, or in addition thereto, there may be provided means for determining the amount which each animal has consumed from a feeding station. A determination of an amount consumed by an animal may be made using any suitable means, which may, for example, include weighing means at a trough associated with each feed station and dispenser.

The amount consumed or deemed to have been consumed by an animal at each visit to a feeding station may be monitored and may be stored in a memory of the control system for allowing a determination to be made of the rate of consumption of feed by the control system. To this end, a processor may determine the amount of feed consumed with in a given time period, which may be a number of hours or days or weeks. Determinations can also be made of an average consumption of each type of feed over a given time period, for example a certain number of hours or days, which may be a recent time period or any determined time period. In this way, it may be determined, for example, how much feed or how much of a particular kind of feed is eaten by an animal on an hourly or half-daily or on a daily or two-daily basis. The determination of the consumed quantity of feed provides an indication of a young animal's readiness to be weaned. For example, depending on the breed of animal, some calves may be considered ready to be weaned when they consume between 0.5-1 kg of feed per day over a period of two consecutive days.

According to aspects of the invention, an animal installation comprises a control system and may comprise at least one feed station with a feed dispenser, wherein the feeding station further comprises a height measuring device. The feed station may suitably be adapted to dispense metered quantities of feed to individual animals, wherein the control system may be capable of monitoring and recording the quantity of feed consumed by an individual animal. Each feed station may comprise a control system, or there may be a control system associated with more than one feeding station. Moreover, the control system may be configured to record height measurements from the height measurement device. It is to be understood that a control system for a feed station may be an individual control system for a given feed station or it may be a control system of an installation which operates in association with a given feed station. More particularly, the control system of any feed station may be a control system for an animal installation which may comprise multiple feed stations and also in some cases multiple milking parlours, which may be in the form of automatic milking robots.

An animal installation according to aspects of the present invention may suitably be controlled using a microprocessor or microcomputer control device associated with one or more memory devices for storing, updating and retrieving data concerning the operation of the installation and individual animal information concerning the animals which are supplied with feed at a feeding station. Thus, the control system will optionally be capable of actuating and monitoring all active elements of the feeding station or of any selected location or station where a height gauge is installed. The control system may, in combination with a memory device, suitably store information concerning each animal, including each animal's entitlement to liquid feed at given times per day. In this way, an animal may be denied or allowed to receive feed upon presenting itself at a feed station and upon registering its presence via an actuator or sensor provided at a feeding nozzle and/or additionally upon being identified by an identification system comprising for example a transponder/receiver in connection with the control system.

Furthermore, all information concerning consumption of feed by each animal both in absolute terms and in terms of consumption per unit time will be stored by the control system for later retrieval. Additional information may be gathered within the animal installation of the invention and stored in appropriate memory devices in files or registers containing data relating to individual animals. Certain animal information obtained externally of the installation may be input into a control system of the animal installation using any appropriate input device. Thus, additional relevant parameters of individual animals may be stored as data in data files of the installation of the invention. Such data may include animal weight, animal girth size, animal age in days, weeks or months or animal hip width. When a parameter is obtained automatically by the apparatus according to the present invention, it may in particular be collected repeatedly. A latest measurement may thereby provide an updated parameter value, while previous measurements may be stored and used as historical values.

A height gauge for use in accordance with the present invention may be a part of a height measurement system. It may be capable of automatically determining the height of an animal at a selected location in an installation.

According to one aspect of the invention, a height gauge associated with each feeding station or station may measure the height of individual animals at each visit to the location in question. The control system may record the measured values in a memory.

Height measurement may be carried out in any suitable way. The location on the back of the animal from which a height measurement is taken may typically correspond to the withers of the animal or to the animal's hips, either of which provide a standard location for a height measurement of the animal. Other locations on a back of an animal may also be appropriate. In one aspect, there may be provided laser emitter and receiver means located at a feed station. The emitter and receiver may be arranged such that a laser beam or pulse may be projected downwards into an animal space at a selected location in the installation. When an animal is present in an animal space at the selected location, then the laser beam or pulse will be projected onto a suitable part of the back of the animal. In cases where a suitable location is a feeding station, a laser beam or pulse may be projected onto the back of an animal during feeding. When a selected location is a cleaning station or a treatment station, then a laser measurement may be carried out while the animal is present in an animal space of the treatment station or cleaning station. Preferably, the measurement may be made while the animal is undergoing a particular treatment or the cleaning operation. A height determination may thereby be made when an animal is substantially immobile. As mentioned, the height measurement may be made using a laser beam or pulse emitter, and using a receiver for laser radiation, both disposed at a height above the level of the feeding station or above the level of an animal at the feeding station. The incoming reflected laser radiation may be analysed in a manner known per se in order to determine the height of the animal at the point of reflection of the laser beam.

Alternatively, there may be carried out a determination of height of an animal using an ultrasound emitter positioned at a location above and animal space at a selected location in an installation. Ultrasound radiation may be projected down onto an animal substantially as described in relation to a laser. Reflected ultrasound can be received using a receiver and analysed for a determination of the height of the animal in the path of the emitted and reflected ultrasound waves.

In a still further alternative embodiment, a light beam or a series of light beams may be projected across an animal space at a feeding station. Suitable light emitters which produce light beams for determining the height of an animal may for example emit visible or infrared light. In one embodiment, a succession of horizontal beams may be oriented across an animal space at a feeding station, with each beam being provided at a progressively incremental height above the ground level of the animal space. One or more beam reflectors may be provided at the side of the animal space opposite to one or more beam emitters for reflecting emitted beams back across the animal space. Alternatively, emitters and reflectors may be distributed on both sides of the animal space. One or more receivers, which receive and detect reflected light from the emitters are disposed opposite one or more reflectors. When a light beam or a series of light beams are employed, the light beam receivers may detect the presence of an animal up to a given height, namely, the uppermost interrupted beam height. A system controller, suitably configured, will thereby be capable of making a determination of animal height to an accuracy which is dependent upon the vertical height of any interrupted beam and based upon the vertical spacing of respective beams from one another. In certain cases, beams may not necessarily be horizontal, but may merely project across an animal space a in order to be reflected by a known reflector element in such a manner and at such an angle that a determination may be made as to the presence of absence of a part of the animal at height which corresponds to a known height within the height gauge or height measurement device.

Measured values which are obtained using each or any of the height measurement methods in accordance with the present invention may be processed by a processor which may be part of or associated with the control system of the installation of the present invention. In some cases, there may be height readings taken at multiple locations in relation to an animal and in relation to the animal which is feeding. In this way, there may be obtained an average height of an animal within a given area at a selected location. Readings which correspond to a floor height or a height below a predetermined lower threshold value deemed to be too low to correspond to an animal in question may thereby be discarded from the collected values. According to aspects of the invention, a height measurement of an animal which is to be recorded and stored may be determined from an average of two measured values made at two locations in relation to an animal. The locations may be two locations on or across the back of an animal. In further aspects of the invention, a height measurement value which is stored may be a value which is determined from three or more than three measured values at distinct locations in respect to or on an animal. A stored value may thereby be a measured value or a determined value derived from measured values. In other aspects of the invention, a height determination may be made by a single height gauge while an animal is passing the position of the gauge. This may occur where a gauge is placed at a location such as a race or passageway where animals are in motion, or it may occur as when an animal is in the process of entering a selected location such as a milking station or feeding station. Accordingly, a rapid series of measurements may be made as an animal passes a target zone of a height gauge. A target zone in this context can be seen as an active region for the purposes of detection, by one or more sensors of the height gauge, of the presence of an animal or part of an animal. An average height of an animal may be determined from multiple measurements made as the animal passed the target zone of the height gauge. In relation to this and other embodiments, given the possibility that any animal might not adopt the same aspect in relation to a height gauge during successive measurements, there may be carried out a determination of a height of an animal on the basis of an average of a latest measurement and past measurements. For example, a current height value may be the result of an average of n most recent stored measured values, where the value of n may be two or three or four, to reflect the two or three or four most recent measurements. The value of n may be selected according to a variety of factors such as rate of growth of an animal. Alternatively, a current value of the height of an animal may be an average of all stored measured values in the past n days, which may be one day or two days or any suitable number of days. In order to prevent erroneous values from being stored, a comparison may be made between a most recent or current measured value and a previous stored measured value or average value. Measured values which deviate from an earlier recorded value by more than a predetermined permissible maximum may be disregarded and will not be stored as historic or current measured values in a register or data file of the animal in question.

In accordance with the invention, there may be made repeated height measurements of individual animals. It may be desirable to measure animals' height each time it visits a given location such as an animal feed station or a milking parlour or stall or another location in an animal installation at which a height measurement device is installed. In this way, there may for example be obtained daily or twice daily measurements of animals' height. At the very least, animal height may be measured weekly.

In a further aspect of the invention, the control system may be capable of comparing measured values for height and/or quantity of dry feed consumed with predetermined threshold values for those respective parameters. The system may be capable of making a determination as to whether threshold values of animal height and/or dry feed consumption have been met or exceeded, in order to give an indication, by means of a signal, that an animal is ready for weaning. In some cases, the control system may be capable of giving a signal indicating that an animal is ready for weaning purely on the basis of a determination of whether a threshold value of either height or dry feed amount consumed has been met or exceeded. Alternatively, an indication as to readiness for weaning may be made by the control system on the basis of a determination in relation to more than one parameter exceeding a threshold value. In some cases, additional parameters may be monitored in order to make a determination of readiness for weaning, such as an animal's age, its weight or other body dimensions or its rate of consumption of water, which may be a quantity of water consumed in a given time period, such as a daily or two-daily consumption quantity of water. A system for determining readiness for weaning may take into account any combination of these recited parameters.

Similarly, according to a further aspect, a determination of the amount of dry feed consumed by individual animals at each visit to a feed station and during any period of one or two days may be made and stored in a memory of the control system. The dry feed quantity consumed may be determined in the form of a figure for a rate of consumption of dry feed per unit of time, which may be a consumed quantity per hour or per number of hours or per day or per number of days. The measured values may be recorded in a memory of the control system and may be used for animal management purposes.

In certain embodiments, there may additionally be provided a dispenser for water at each feed station. Water is advantageously made available to animals in unlimited amounts. It has been observed that an increased consumption of water may be correlated with an increased consumption of dry fodder, which is to be encouraged in order to promote early adaptation of animals to dry fodder. Therefore, there may be provided water supply means in the form of a water dispenser which comprises measurement means for determining the quantity of water consumed by a given animal. The identity of an animal consuming water can be established using customary identification transponder type system. In cases where an individual animal is kept in an enclosure which is a feeding station, then identification means may be dispensed with, because a control system will be set up with the identities of each animal pre-established in correspondence with the respective feed station or feed stations. A level sensor or flow sensor may typically be incorporated in a water dispenser for measuring the amount consumed. Measured amounts may be relayed to the control system. In aspects of the present invention, a determination of the quantity of water consumed by an individual animal may be made in order to enhance the condition monitoring utility of the apparatus disclosed herein. In particular, a measured rate of water consumption of an animal, which may be an hourly or a daily or a two-daily or possibly a weekly consumption quantity and may be compared with a predetermined minimum threshold value for water consumption. A signal or information display may be generated I case a threshold value is determined to have been breached.

In some aspects of the present invention, the threshold value for a weaning height of an animal may be specific to the individual animal. This may be determined for example by ascertaining certain parameters of an individual animal at its birth or within the first days of its life, such as the height dimension of an animal at birth, and possibly taking into account other factors such as relevant information pertaining to the animals' parents or grandparents.

By monitoring height and change in height, there may be a reliable determination of the suitability of an animal's regime including its feed regime during the entire growth period of an animal, for example, during its early pre-weaning period and including its further development.

In cases where a feeding station can supply liquid feed, a feeding station may typically include a feed dispenser which may comprise a drinking nozzle in the form of a nipple allowing an animal to suckle in order to obtain liquid feed or water supplied to the nozzle via a supply line and/or a branch thereof. Such a drinking nozzle sensor also provides an indication of the time during which an animal is at the nozzle. In some embodiments, there may be provided an actuator switch or sensor in co-operation with a drinking nozzle in order to actuate a valve to open the feed or water supply to the nozzle when an animal is present at the nozzle and attempting to feed. Thus, in certain embodiments, each dispenser may comprise an open/close valve for supply of liquid feed.

In order to determine the quantity of liquid feed which is consumed at any given time, there may be provided a flow meter capable of measuring the volume flow of liquid through the supply line during feeding. In certain cases, a pump may be required at the dispenser in case there is insufficient liquid pressure in the supply line for enabling feeding at the desired rate. The number of feeding stations may vary greatly, from between one to about fifty stations or more. In certain distribution system installations, there may be a single feed station per animal pen, with perhaps a single animal in each pen. In such cases, each feed station is particular to an individual animal. In some cases, more than one animal may be kept in a single pen. Alternatively, there may be provided one or more feed stations provided in a pen housing a large or small group of animals. In cases where more than one animal may have access to a particular feed station, there may typically be provided identification means at the feed dispenser, such as transponder receiver means co-operating with a transponder identity tag worn by an animal. This enables a determining the identity of an animal which is using or seeking to use the particular dispenser at the feed station in question. The identification of animals is an important aspect of controlling and monitoring the amount of liquid and dry feed given to an animal and the time during which the feed is given. Identification of animals is also important for a system to be able to monitor animals' progress and to store in memory any information gathered from an animal during the feeding visit.

Therefore, and identification system may be provided in combination with any additional system of an animal installation, where either measurements of an individual and identified animal is to be made, or where feed of any kind is to be given to or withheld from an animal.

In some embodiments, each feeding station may comprise a feed dispenser in which feed supply hoppers are contained which may be replenished as the feed is consumed. Measured amounts of feed may be dispensed to feeding animals from the hoppers or storage tanks to a feed nozzle or feed trough. Also water may be supplied via a collective supply line or it may be supplied from a tank or refillable receptacle at a feed station.

Any feeding station may desirably comprise means for supplying dry feed to an animal. In some cases, a feeding station may only comprise dry feed supplying means. The dry feed may be made available to animals in any suitable manner. Thus, dry feed may for example be available to animals freely on demand, or in measured doses provided at regular intervals. The dry feed supply device provided at each feed station, in addition to a liquid feed supply system, may advantageously comprise means for determining the dry feed quantity consumed by an animal on an ongoing basis. Advantageously, a determination of the dry feed consumption of individual animals may be made per unit of time, which may be an hourly or daily or two-daily or weekly determination, or any other appropriate time period. The amount of food consumed by an individual animal may in particular be monitored using a known quantity determining system at a dry feed trough, which may in particular incorporate a weighing device. Known systems for dispensing measured quantities of dry feed to an animal include auger means with a controllable drive or other means for dispensing discrete predetermined portion sizes. In certain embodiments, a feed station may comprise dry feed supply means only, without liquid feed supply. Any feed dispenser suitable for use in the present invention may be capable of supplying one type of feed, such as liquid or dry feed, or there may be a feed dispenser capable of supplying both liquid and dry feed from a single dispenser housing.

By measuring an animal during feeding or cleaning or during any other operation, the present invention provides an improvement in the determination of an animal's height, because measuring an animal while it is occupied in feeding or another activity, takes advantage of a moment in time when the animal is sufficiently stationary for a reasonably reliable measurement to be obtained. Moreover, during feeding or while standing still during another operation, an animal will usually adopt a predictable posture thereby facilitating a measurement by automatic means. The provision of automated height measurement equipment for making measurements in an animal installation thereby provides a dual benefit of improved height measurement and reduced burden of manual measurement.

In some cases, during the liquid feeding stage of an animal, by taking into account the height of an animal in addition to the quantity of voluntary dry feed intake, an animal may be determined to be suitable for weaning at a lower threshold value of a dry feed consumption rate than when only dry feed consumption is considered, without the additional height criterion. On the other hand, there may be animals which, during the time in which they are fed with liquid feed, consume a voluntary dry feed amount above a threshold amount for weaning which are nevertheless not ready for weaning when considering other factors. Thus, where an animal has not reached a minimum height, then it may be prevented from being weaned too early, if a height measurement indicates that it is insufficiently developed. The consideration of these two, and possibly more, parameters for weaning readiness thereby provides a more holistic and accurate approach to the weaning determination.

For monitoring the development of animals beyond the first months of their lives the present invention may provide automatic height measurement means at any suitable location in an animal installation which may be a location other than a feeding station.

The present invention enables an easy, reliable and early determination of the readiness for weaning of individual animals. Furthermore, scientific studies have shown that tall lean heifers reach puberty at a younger age and may therefore be capable of calving earlier than more corpulent or fatter animals. The present invention makes it possible not only to recognise taller leaner animals, but also to adapt animal management parameters such as parameters relating to feed in order to promote the development of taller leaner animals.

Exemplary embodiments of the installation of the present invention are described in the following text with reference to attached drawings in which.

Figure 1:
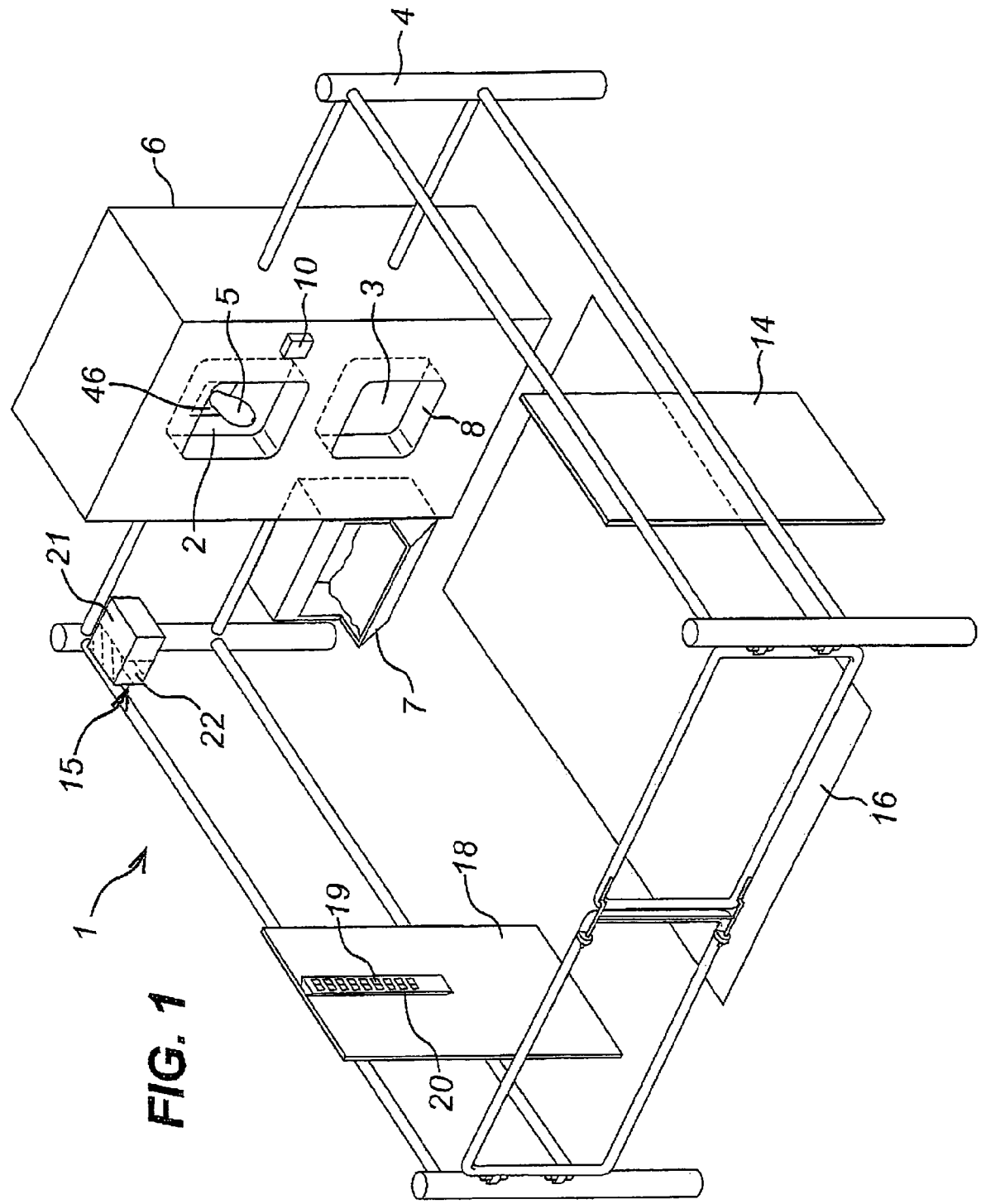
FIG. 1 shows a simplified diagram of a feeding station for a young animal incorporating a height gauge.
Figure 2:
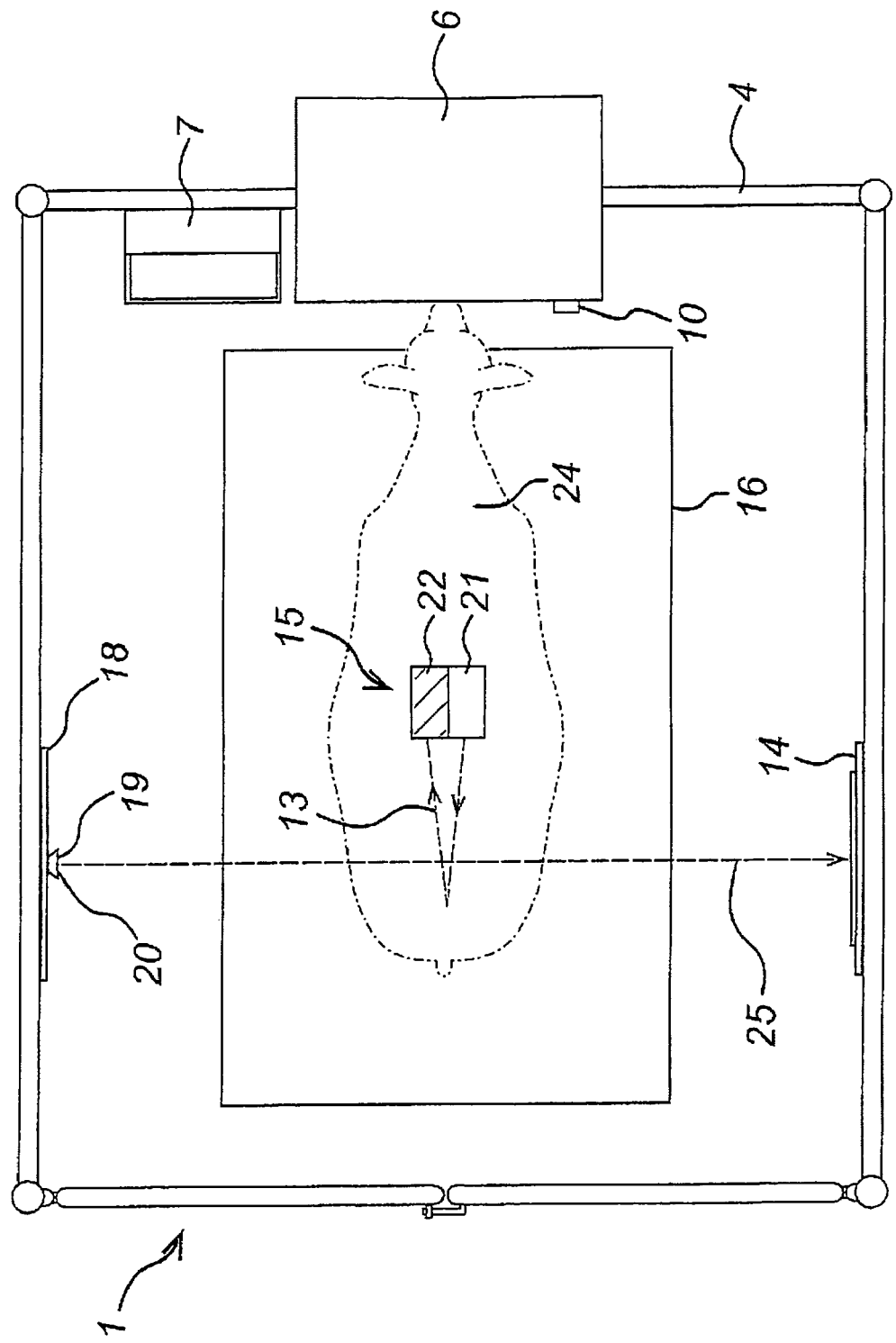
FIG. 2 shows a simplified plan view of an animal feed station similar to that depicted in FIG. 1.

FIGS. 1 and 2 show views of a part of an animal installation comprising a feeding station 1 having feed dispensers in the form of a liquid feed dispenser 2, and a dry feed dispenser 3. The illustrations show an animal feeding station which is intended for young animals such as calves, although the invention is not limited to installations for calves. The feeding station 1 is provided at an enclosure which may be a pen 4 capable of receiving one or more animals such as calves, piglets, lambs, goats, foals etc. In the embodiment which is depicted, the dry feed dispenser 3 and the liquid feed dispenser 2 are both provided within a housing 6. A water dispenser is provided separately although it may also be provided within the same unit as a dry or liquid feed dispenser. Other embodiments may provide for dispensers to be provided as separate devices each in its own housing. The dispensers 2, 3 may be supplied with respective liquid and dry feed by means of mixing devices (not shown) located at the feed station 1 or they may be supplied via lines (not shown) from a remote feed preparation station (not shown). The liquid feed dispenser 2 preferably comprises a nozzle 5 for allowing an animal to consume the liquid feed by suckling, while the quantity which an animal is permitted to consume is known within the control device (not shown in FIG. 1). The quantity actually consumed is monitored and if necessary, the supply of liquid feed to the nozzle 5 may be interrupted when it is determined that an animal has consumed its full entitlement. In any case, the quantity consumed by an animal at each feeding session is stored in a memory of the control device. Dry feed is supplied via the dry feed dispenser 3 and may be made available to an animal on demand. The dry feed dispenser may additionally comprise weighing means 8 for determining the quantity of dry feed consumed by an animal. In some cases, in order for the system to be able to determine which animal is feeding, an identification device 10, which may co-operate with a transponder type device worn by an animal, may be provided at the feed station 1, in the vicinity of a feed dispenser 2, 3. A determination of the dry feed quantity consumed may be made and stored in a memory on a per-visit basis, whereafter a control device may compute a rate of consumption of dry feed on e.g. a quantity per-hour or per-day basis. Metering means at each dispenser ensure that known quantities of each type of feed are dispensed. Water may be freely available from a water dispenser 7 which may be capable of determining the amount of water consumed by an individual animal and of relaying the corresponding measured value along with other values for an individual animal to an appropriate data file for the individual animal.

For monitoring the development of an animal, a height measurement device 15 or 18 is shown in association with the feeding station 1. In the example illustrated in FIG. 1 and in the remaining figures, two examples of height gauges are shown, although in practice only one or the other height gauge may be provided. It should be noted that the feed station is illustrated as an example of a selected location in an installation where a height determination may be made. Other appropriate locations for height determination fall within the scope of the present invention. The laser height measurement device 15 may comprise a laser emitter 21 and receiver 22 disposed at a level above the height of an animal which is present in the enclosure and which is feeding at the feed station 1. In the example shown, the laser is directed downwards into an animal space at the feed station. The laser emitter 21 may appropriately be configured to emit a laser beam or laser pulse 17 which is targeted at a location known to correspond to the back of an animal 24 when it is in position utilising the feed dispenser 2. Most preferably, the laser 15 may be set up so that it is aimed at a point corresponding to the withers or to the hips of an animal which is using the feed dispenser 2. The reflected beam or laser pulse 13 may be received by the receiver 22 and analysed in order to determine the animal height. Alternatively, a height measurement device 18 in the form of a light emitter 19 and a light receiver 20 or comprising a series of emitters and receivers 19, 20 may be disposed on one or on both sides of the animal space at the feeding station 1. Each emitter 19 is capable of emitting light transversally in a beam (shown as a dotted line across the animal space in FIG. 2) across the animal space to a reflector plate 14 on an opposite side of the animal space. The reflected light from each respective emitter 19 is receivable by a respective receiver 20. When an animal present at the feeding station 1 is determined to be feeding, a determination may be made as to the animal's height by the control means emitting and detecting a laser pulse from the laser measurement device 15. Alternatively, at the time of measurement a light beam (or infrared beam), the presence of an animal in the animal space between an emitter 19 and the reflector plate 14, will be detected by the receiver 19 which, when no reflected light is received, will provide a means for the control system to determine that the height of the animal at the point in the vicinity of the receiver 20, is equivalent to at least the height of that receiver. When multiple receivers and emitters are provided, as shown in FIG. 1, these may be arranged at progressive heights so that there may be made an accurate determination of the height of an animal and there may be monitored a progressive development of the said height. In FIGS. 1 and 2, both a laser measurement device 15 and a light emitter device 18 are shown, although in practice, only one such device would be required at any one feed station. In some cases, ultrasound waves or infrared radiation may be utilised for making measurements in place of lasers. The invention may also be carried out using one or more imaging devices such as a camera or video camera for determining an animal's height, although previously recited devices are preferred for reasons of simplicity and cost.

A measured height of an animal may be determined from the measurement which is made by the measurement device 18 or 15. The accuracy of the measurement will be dependent upon the accuracy and resolution level of the measuring equipment. It may for example appropriately be determined to the nearest millimetre, centimetre, two centimetres or five centimetres or more.

Also shown in FIGS. 1 and 2 is a weighing device 16 in the form of a plate connected to detection means for detecting the weight of objects placed upon the plate 16. There may thus be determined, in a manner known per se, the weight of an animal in the animal space inside the enclosure or at any suitable location in an animal installation such as in a treatment stall or milking stall.

Figure 3:
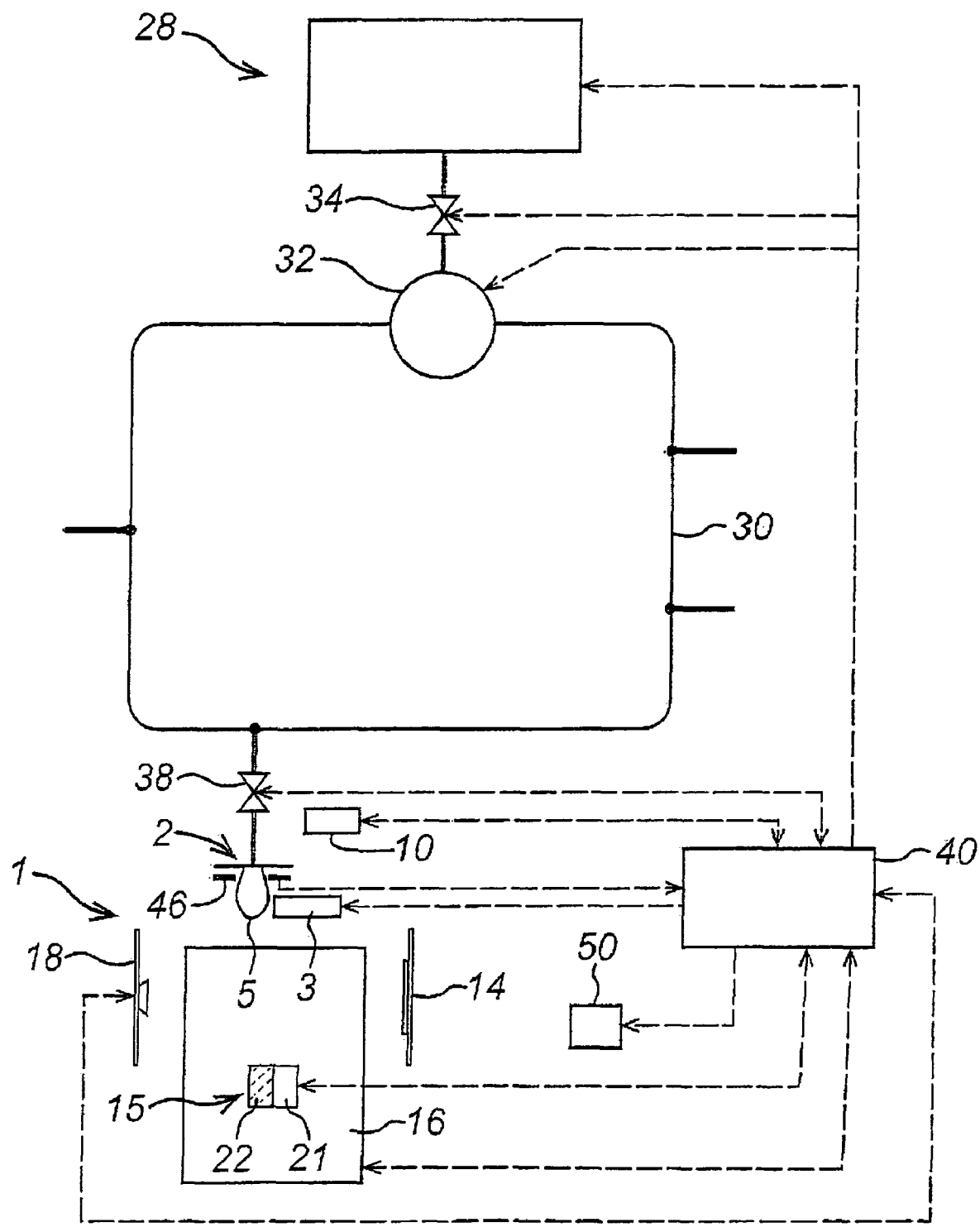
FIG. 3 shows a schematic diagram of an animal feed station comprising height measurement means.

FIG. 3 illustrates a system configuration according to an exemplary embodiment of the invention, in which an animal installation comprises multiple feed stations 1, only one of which is depicted in detail in the drawing. In this embodiment, liquid feed is supplied to a feed station 1 from a remote feed preparation apparatus 28 via a supply line 30. A pump 32 and a flow control valve 34 enable the flow of liquid feed to the respective feed stations 1 to be controlled. A dry feed dispenser 3 and a liquid feed dispenser 2 are incorporated with in the feeding station 1. A separate water dispenser is not shown in this diagram. The liquid feed dispenser additionally comprises a flow valve 38 which may incorporate a flow meter (not shown). Alternatively, a flow meter may be provided separately or in combination with an additional pump (not shown) at the feeding station. A feeding sensor 46, which is capable of detecting when an animal is feeding from the nozzle 5 at the feeding station 1 is also shown in this embodiment. Also the dry feed dispenser 2 may comprise a meter (not shown) for controlling the quantity of dry feed made available at any given time or within any given time period.

Also shown are identification means 10, and respective height measurement means 18 and 15, only one of which may be provided at any given feed station.

Control system 40 is capable of co-ordinating and actuating all active parts of the animal installation in order to ensure that feed is supplied to the selected location, which in the case illustrated is a feeding station 1, and in order to determine when measurements are to be made. Also the storing of measured values as well as processing and comparison of measured and calculated values is carried out by the control system.

The operation of the animal feeding station 1 will be substantially in accordance with known automated and controlled animal feed stations in respect of the provision of liquid feed in measured and predetermined amounts and in aspects concerning monitoring the liquid feed quantity consumed by a young animal. When an animal approaches the feed station 1 and attempts to suckle on the nozzle 5, its presence will be detected by the control system, either by means of the identification sensor 10, or by means of the feeding sensor 46 or both. When it is determined within the control system 40 that the animal at the feed station is entitled to receive feed, then feed will be dispensed via the feed dispenser 2 and the control system will register, also by means of the sensing of a continued presence at the nozzle sensor 46, that an animal remains present at the feeding station. During that time, a height measurement of the animal may be made using an appropriate system 15 or 18, and the result of the height determination will be stored in a memory of the control system 40. Height measurements may be made daily or whenever possible, in order to build up a complete picture of an animal's development over time. A determination of the weight of an animal may be made in the same way by means of the plate 16 and the control means 40. Thus, a profile of the weight development of the animal may be obtained and stored.

In a further aspect of the invention, the height measurements obtained by the control system 40 may be compared with a predetermined threshold value stored within the system 40. This may allow a determination to be made, whether an animal has attained the expected minimum height required before weaning. Further comparisons of measured values with stored threshold values, such as dry feed amount consumed in a given time period or amount of water consumed in a given period or animal weight or animal age may reveal that also one or more other minimum criteria for weaning have been reached. In case, for example both the dry feed amount per determined period of time and also the height of an animal are determined to be above the required thresholds, then an indication of readiness to wean may be given by the control system. A signal for this purpose may be provided by an indicator means 50 which may be any appropriate information device or transducer.

The height measurement of an animal may be made with a view to determining and monitoring the overall condition of the animal. It has been found that an early determination of a deviation of an animal from its optimal condition reduces the cost of bringing that animal back into an optimal condition. For example, it may be that an enhanced diet may be required to bring a growing animal back to its optimal condition. When an animal has been outside its optimal condition for a prolonged period, especially a growth period, it can be very costly to bring the animal back to an optimal condition. The present invention, which according to certain aspects may provide a means and method for automatic determination of the height of an animal can greatly enhance the effectiveness of animal rearing by giving regular and up to date indications of an animal's condition. An animal's condition monitoring may be further enhanced by a control system 40 associated with of the present invention being capable of calculating a height-to-weight ration of animals whose height is measured. In some cases, a height to weight ratio may be calculated on the basis of historical information stored in relation to an animal.

Any stored values may be compared with threshold values in order to give an indication of the condition of the animal. An alarm signal or warning signal or any suitable information display may be generated by the control system in case it is determined that any of the measured or stored parameters relating to the animal in question lie outside a predetermined tolerance range. This is established in the same way as with other embodiments, namely, by making comparisons with maximum and/or minimum threshold values as the case may be.

The above examples are provided for illustration and are not intended to limit the ways in which the claimed invention may be carried out. In particular, the illustrated examples portray an animal feeder which includes a liquid feed supply and a dry feed supply. A feeder in an installation of the present invention may be provided in the form of a dry feeder only or a liquid feeder only.

The invention claimed is:

1. A method for automatically determining readiness of an individual animal (24) for weaning off liquid feed, the method comprising the steps of:
   automatically measuring a height of an individual animal using a height measuring apparatus located within an animal installation;
   determining whether the measured height is equal to or exceeds a predetermined threshold height value; and
   determining that the animal is ready for weaning when the measured height is determined to equal or exceed said predetermined threshold height value,
   wherein the animal installation, in which said automatically measuring the animal's height step is performed in, comprises an animal feeding station, a control system, an automatic height measurement apparatus, and
   wherein said control system is configured for automatically performing said step of determining that the animal is ready for weaning when the measured height is determined to equal or exceed said predetermined threshold height value.

2. The method of claim 1, further comprising the steps of:
measuring the animal's consumption rate of dry feed;
determining whether the measured consumption rate is equal to or exceeds a predetermined threshold consumption rate of dry feed value; and
further determining that the animal is ready for weaning when the measured consumption rate is determined to equal or exceed said predetermined threshold consumption rate of dry feed value, and when the measured height is determined to equal or exceed said predetermined threshold height value.

3. The method of claim 1, wherein,
the measured height of the animal, from the automatically measuring step, comprises a change of height of the animal in relation to a previous height measurement of the animal, and
said predetermined threshold height value is a threshold value for an individual animal.

4. The method of claim 1, wherein,
said automatically measuring step of the animal's height is carried out while the animal is feeding at said feeding station of the animal installation.

5. The method of claim 1, further comprising the steps of:
measuring an additional parameter of the animal, the additional parameter being selected from the group consisting of animal age, animal weight, animal girth size, animal hip width, and rate of consumption of water by the animal;
determining whether the measured additional parameter is equal to or exceeds a predetermined threshold additional parameter value; and
further determining that the animal is ready for weaning when the measured additional parameter is determined to equal or exceed said predetermined threshold additional parameter value.

6. An animal installation, comprising:
an animal feeding station;
a control system; and
an automatic height measurement apparatus connected to said control system, said automatic height measurement apparatus configured to automatically determine a height of an individual animal in said installation, wherein,
said control system is configured for determining a first condition of when a measured height of the animal in said installation equals or exceeds a predetermined threshold height value, and
said control system is further configured to automatically determine a readiness for weaning of the animal off liquid feed when determining the first condition that the measured height of the animal in said installation equals or exceeds the predetermined threshold height value, automatically indicating the readiness for weaning the animal.

7. The animal installation of claim 6, wherein,
said control system is further configured for i) determining a second condition that a measured rate of consumption of dry feed by the animal in said installation equals or exceeds a predetermined threshold rate of consumption of dry feed value and ii) emitting a signal when both said first and second conditions are fulfilled.

8. The animal installation of claim 6, wherein said automatic height measurement apparatus comprises a height gauge provided at said feeding station.

9. The animal installation of claim 6, wherein said feeding station comprises a dispenser for liquid feed and a dispenser for dry feed.

10. The animal installation of claim 6, wherein said control system is further configured to i) determine a height-to-weight ratio parameter of the animal, and ii) to store the determined ratio parameter in a memory of said control system.

11. The animal installation of claim 10, wherein said control system is further configured for i) comparing a determined height-to-weight ratio parameter of the animal with predetermined maximum and minimum threshold values for said parameter, and ii) for indicating when either said minimum or maximum threshold is exceeded.

12. The animal installation of claim 6, further comprising:
an animal weighing system configured for automatically measuring a weight of the animal and storing the measured value in a memory of the control system.

13. An animal installation, comprising:
an animal feeding station;
a control system; and
an automatic height measurement apparatus connected to said control system, said automatic height measurement apparatus configured to automatically determine a height of an individual animal located at a selected location within said installation, wherein,
said control system (40) is configured for determining a first condition of when a measured height of the animal in said installation equals or exceeds a predetermined threshold height value,
said control system (40) is configured to automatically determine that the animal is ready for weaning when the measured height is determined to equal or exceed said predetermined threshold height value, and
said animal feeding station is configured for measuring the animal's consumption rate of dry feed, said control system is configured to automatically determine a second condition of whether the measured consumption rate is equal to or exceeds a predetermined threshold consumption rate of dry feed value, and said control system is further configured for determining that the animal is ready for weaning when the first and second conditions are both satisfied.

14. The animal installation of claim 13, further comprising an animal weighing system, wherein,
a weight measurement of the animal from the animal weighing system is stored in the control system, and
said control system is further configured for i) comparing a determined height-to-weight ratio parameter of the animal with predetermined maximum and minimum threshold values for said parameter, and ii) for indicating when either said minimum or maximum threshold is exceeded.

15. The animal installation of claim 13, wherein said control system is further configured for determining whether a measured additional parameter is equal to or exceeds a predetermined threshold additional parameter value, and determining that the animal is ready for weaning when the measured additional parameter is determined to equal or exceed said predetermined threshold additional parameter value, the additional parameter being selected from the group consisting of animal age, animal weight, animal girth size, animal hip width, and rate of consumption of water by the animal.

* * * * *